US008470292B2

(12) United States Patent
Kang et al.

(10) Patent No.: US 8,470,292 B2
(45) Date of Patent: Jun. 25, 2013

(54) HYDROGEN PRODUCTION METHOD FROM WATER BY THERMOCHEMICAL CYCLES USING GERMANIUM OXIDE

(75) Inventors: Kyoung-Soo Kang, Daejeon (KR);
Chu-Sik Park, Daejeon (KR);
Chang-Hee Kim, Daejeon (KR);
Ki-Kwang Bae, Daejeon (KR);
Won-Chul Cho, Seoul (KR)

(73) Assignee: Korea Institute of Energy Research, Daejeon (KR)

( * ) Notice: Subject to any disclaimer, the term of this patent is extended or adjusted under 35 U.S.C. 154(b) by 284 days.

(21) Appl. No.: 12/990,726

(22) PCT Filed: Oct. 30, 2008

(86) PCT No.: PCT/KR2008/006407
§ 371 (c)(1),
(2), (4) Date: Nov. 2, 2010

(87) PCT Pub. No.: WO2010/016641
PCT Pub. Date: Feb. 11, 2010

(65) Prior Publication Data
US 2011/0044890 A1    Feb. 24, 2011

(30) Foreign Application Priority Data

Aug. 6, 2008   (KR) .................. 10-2008-0076880
Oct. 29, 2008  (KR) .................. 10-2008-0106287

(51) Int. Cl.
*C01B 3/08*     (2006.01)
*C01G 17/02*    (2006.01)
(52) U.S. Cl.
USPC ........................................ 423/657; 423/618
(58) Field of Classification Search
USPC .......... 423/657, 648.1, 618; 429/17; 420/900; 206/0.6
See application file for complete search history.

(56) References Cited

U.S. PATENT DOCUMENTS

| 4,182,748 | A | 1/1980 | Anderson |
| 4,310,503 | A * | 1/1982 | Erickson ........................ 423/657 |
| 6,663,681 | B2 | 12/2003 | Kindig et al. |
| 2006/0213331 | A1* | 9/2006 | Otsuka et al. ................... 75/627 |

OTHER PUBLICATIONS

Miller et al. "Metal oxide composites and structures for ultra-high temperature solar thermochemical cycles" Apr. 30, 2008, J. Mater. Sci 43, 4714-4728.*
Miyamoto et al. "Development of Germanium Oxide Media for the Production of Concentrated Hydrogen by the Steam-Iron Process",1984, Ind. Eng. Chem. Prod. Res. Dev, 23, 467-470.*
Miyamoto et al., "Development of Germanium Oxide Media for the Production of Concentrated Hydrogen by the Steam-Iron Process", Ind. Eng, Chem. Res. Dev., 1984, pp. 467-470, 23.
Kang et al., "Novel two-step thermochemical cycle for hydrogen production from water using germanium oxide: KIER 4 thermochemical cycle", International Journal of Hydrogen Energy, 2009, pp. 4283-4290, 34.

* cited by examiner

*Primary Examiner* — Wayne Langel
*Assistant Examiner* — Syed Iqbal
(74) *Attorney, Agent, or Firm* — The Webb Law Firm

(57) ABSTRACT

The present invention relates to a hydrogen production method from water by using germanium oxide, more precisely a hydrogen and oxygen production method from water by thermochemical cycles using germanium oxide. The method of the present invention facilitates the production of hydrogen by multi-step thermochemical cycle using germanium oxide, so that it is characterized by that the thermochemical cycle is low temperature reaction and only water is consumed and other materials are not consumed but circulated.

4 Claims, 9 Drawing Sheets

HYDROGEN PRODUCTION METHOD FROM WATER BY THERMOCHEMICAL CYCLES USING GERMANIUM OXIDE

TECHNICAL FIELD

The present invention relates to a hydrogen production method from water by using germanium oxide, more precisely a hydrogen production method from water by thermochemical cycles using germanium oxide.

BACKGROUND ART

As fossil fuel such as petroleum, coal and natural gas is being exhausted and problems caused by the fossil fuel such as environmental contamination and global warming get serious, it is urgently requested to develop clean energy source to replace the fossil fuel.

As an effort to develop alternative energy for fossil fuel, studies have been undergoing to convert natural energy such as solar heat, wind force and tidal power directly into electric power and to produce hydrogen energy from natural resources such as water.

Hydrogen energy is the most promising candidate for alternative energy because it uses water as a raw material which is most abundant on earth, it does not produce any pollutant during hydrogen combustion, suggesting that hydrogen energy is very clean energy, and it is also functioning as a storage medium for energy.

The representative methods for producing hydrogen from water are biological method, photochemical method, electrolysis, direct thermolysis and thermochemical degradation. Electrolysis, one of the conventional techniques, is in practical use, but others are still under study.

To decompose water directly to produce hydrogen, high temperature of at least 4000 K is required. So, direct decomposition of water is in fact very difficult. Therefore, water decomposition is tried stepwise, precisely a method is designed to contain chemical reactions induced stepwise at comparatively low temperatures to decompose water, which is a close cycle. That is the hydrogen production method by using thermochemical cycle.

Thermochemical cycle absorbs heat to convert it into hydrogen and oxygen chemically. This method produces hydrogen from water by multi-step reactions including oxidation and reduction of a metal oxide using heat.

Thermochemical cycle can be classified into pure thermochemical cycle and combined thermochemical cycle. The combined thermochemical cycle is developed to supplement and improve the pure thermochemical cycle, for which electrolysis or photochemical method is introduced.

According to the chemical reaction step, thermochemical cycle is classified as 2 step cycle, 3 step cycle, 4 step cycle, etc, and up to 8 step cycle has been notified so far.

Up to date, approximately 300 thermochemical cycles have been reported including 2 step thermochemical cycle using a metal oxide such as Fe, Mn, Zn, Co, Sn and $WO_3$, $ZnO/Zn$, $Fe_3O_4/FeO$, $CeO_2/Ce_2O_3$, and $SnO_2/Sn$ as a material for thermochemical process.

To increase reactivity and thermal stability at high temperature, a transition metal such as Ni and Co or a refractory such as alumina can be mixed or alloyed, particularly in those cycles of ZnO/Zn thermochemical cycle, $Fe_3O_4$/FeO thermochemical cycle, $CeO_2/Ce_2O_3$ thermochemical cycle and $SnO_2$/Sn thermochemical cycle.

(Zno/Zn Cycle)

$$ZnO \rightarrow Zn + \tfrac{1}{2}O_2 \quad 2000°C.$$

$$Zn + H_2O \rightarrow ZnO + H_2 \quad 400°C.$$

($Fe_3O_4$/FeO cycle)

$$Fe_3O_4 \rightarrow 3FeO + \tfrac{1}{2}O_2 \quad 2000°C.$$

$$3FeO + H_2O \rightarrow Fe_3O_4 + H_2 \quad 400°C.$$

($CeO_2/Ce_2O_3$ cycle)

$$2CeO_2 \rightarrow Ce_2O_3 + \tfrac{1}{2}O_2 \quad 2000°C.$$

$$3Ce_2O_3 + H_2O \rightarrow 2CeO_2 + H_2 \quad 400°C.$$

($SnO_2$/Sn cycle)

$$\tfrac{1}{2}SnO_2 \rightarrow \tfrac{1}{2}Sn + \tfrac{1}{2}O_2 \quad 2600°C.$$

$$\tfrac{1}{2}Sn + H_2O \rightarrow \tfrac{1}{2}SnO_2 + H_2 \quad 400°C.$$

The above cycles require high reduction temperature of at least 2000° C. So, construction of composition for a reactor is difficult. The temperature of at least 2000° C. can be obtained by concentrating solar heat, however, it is very difficult to use that heat efficiently because of reflection.

There was a report on 2 step thermochemical cycle in relation to hydrogen production by water decomposition after thermal reduction at 1000-140° C. using Co-ferrite, Ni—Mn-ferrite and Ni-ferrite. However, the thermochemical cycle accompanies non-stoichiometric reaction that is the reduction of some of oxygen in M (Co or Ni, or Ni and Mn)-ferrite, resulting in low hydrogen production with the yield of up to 20 cc/g.

Therefore, thermochemical cycle that facilitates reduction at a low temperature to mass-produce hydrogen from water is required.

DISCLOSURE

Technical Problem

It is an object of the present invention to provide a hydrogen mass-production method from water by low temperature thermochemical cycle using a specific metal oxide that is highly reactive and stable in thermochemical cycle.

Technical Solution

The present invention is characterized by producing hydrogen from water by thermochemical reaction using germanium oxide.

Precisely, the hydrogen production method of the present invention is characterized by producing hydrogen by multi-step thermochemical cycle using germanium oxide as a redox pair.

More precisely, the thermochemical cycle of the hydrogen production method of the present invention characteristically produces hydrogen by $GeO_2$/GeO redox pair, $GeO_2$/Ge redox pair generated by spontaneous decomposition (disproportion) of GeO ($GeO \rightarrow \tfrac{1}{2}Ge + \tfrac{1}{2}GeO_2$) of $GeO_2$/GeO redox pair or combination thereof.

According to the production method of the present invention, hydrogen is produced by the thermochemical cycles of the following reaction formulas 1 and 2.

$$GeO_2 \rightarrow GeO + \tfrac{1}{2}O_2 \quad \text{(Reaction Formula 1)}$$

$$GeO + H_2O(g) \; GeO_2 + H_2 \quad \text{(Reaction Formula 2)}$$

In reaction formula 1, GeO generated from the decomposition of $GeO_2$ is apt to be decomposed spontaneously into $\frac{1}{2}$Ge and $\frac{1}{2}GeO_2$ again during cooling process as shown in the following reaction formula 3 because of chemical instability. At this time, water is decomposed by the following reaction formula 4 to produce hydrogen.

$$GeO_2 \rightarrow GeO + \tfrac{1}{2}O_2 \qquad \text{(Reaction Formula 1)}$$

$$GeO \rightarrow \tfrac{1}{2}Ge + \tfrac{1}{2}GeO_2 \qquad \text{(Reaction Formula 3)}$$

$$\tfrac{1}{2}Ge + \tfrac{1}{2}GeO_2 + H_2O \rightarrow GeO_2 + H_2 \qquad \text{(Reaction Formula 4)}$$

Reduction of $GeO_2$, as shown in reaction formula 1, is performed at 1000-1700° C. in the presence of inert gas under the pressure of 1 atm-0.001 atm. The reduced GeO, according to reaction formula 1, decomposes water (vapor) provided in the step of reaction formula 2 to produce hydrogen and GeO itself is oxidized into $GeO_2$. At this time, the reaction of reaction formula 2 is performed at 200-800° C.

As explained hereinbefore, GeO obtained in the step of reaction formula 1 is a very unstable material, which is easily decomposed into thermodynamically stable Ge and $GeO_2$.

Accordingly, when the reaction of reaction formula 1 is completed, GeO is cooled down, during which GeO is decomposed spontaneously into Ge and $GeO_2$, leading not to the cycle of reaction formula 2 but to the cycles of reaction formulas 3 and 4 to produce hydrogen. Some of GeO generated in the step of reaction formula 1 proceeds to the step of reaction formula 3, so simultaneously with the water decomposition in the step of reaction formula 2, hydrogen can be produced by the water decomposition in the step of reaction formula 4. At this time, the reaction of reaction formula 4 is performed at 200-800° C.

Advantageous Effects

The conventional hydrogen production method by thermochemical water decomposition using an oxide of Fe, Ce, Sn or Zn requires a high reduction temperature, making the construction of composition of a reactor difficult. In addition, efficiency is also very low because of heat loss caused by such high temperature.

The hydrogen production method of the present invention produces hydrogen by thermochemical cycle using germanium oxide, in which the thermochemical cycle is a low temperature reaction, no other materials than water is consumed and instead they are only circulated, hydrogen production efficiency is high and physical properties of germanium oxide are not damaged by the thermochemical cycle.

DESCRIPTION OF DRAWINGS

The above and other objects, features and advantages of the present invention will become apparent from the following description of preferred embodiments given in conjunction with the accompanying drawings, in which.

BEST MODE

The hydrogen production method of the present invention is described in more detail hereinafter with the attached figures. The following figures are only examples provided to those in the art to deliver the idea of the present invention to lead them to full understand. Therefore, the present invention is not limited thereto and can be embodied by other forms. The same reference numbers in this description indicate the same constituents.

Technical terms and scientific terms used in this invention are understood as general meanings that can be understood by those in the art, unless stated otherwise. So, explanations on general functions and compositions that might mislead them off the idea of the present invention are omitted herein.

Metal oxides can be reduced by thermochemical decomposition at a high temperature range where Gibb's free energy is negative value. By this reaction, solar energy can be converted into chemical energy as the reduced form of metal oxides. The reduced metal oxide can be used for decomposition of water to produce hydrogen.

The hydrogen production method of the present invention characteristically produces hydrogen by reducing germanium oxide by thermochemical decomposition and by reacting the reduced germanium oxide with water (vapor).

Precisely, the hydrogen production method of the present invention using multi-step thermochemical cycle produces hydrogen by using $GeO_2/GeO$ redox pair, $GeO_2/Ge$ redox pair or the combination thereof.

When $GeO_2/GeO$ redox pair is used, hydrogen is produced by thermochemical cycles of the following reaction formulas 1 and 2.

$$GeO_2 \rightarrow GeO + \tfrac{1}{2}O_2 \qquad \text{(Reaction Formula 1)}$$

$$GeO + H_2O(g) \rightarrow GeO_2 + H_2 \qquad \text{(Reaction Formula 2)}$$

When $GeO_2/Ge$ redox pair is used, hydrogen is produced by thermochemical cycles of the following reaction formulas 1, 3 and 4.

$$GeO_2 \rightarrow GeO + \tfrac{1}{2}O_2 \qquad \text{(Reaction Formula 1)}$$

$$GeO \rightarrow \tfrac{1}{2}Ge + \tfrac{1}{2}GeO_2 \qquad \text{(Reaction Formula 3)}$$

$$\tfrac{1}{2}Ge + \tfrac{1}{2}GeO_2 + H_2O \rightarrow GeO_2 + H_2 \qquad \text{(Reaction Formula 4)}$$

The step of reaction formula 1 is the reduction step of germanium oxide by thermochemical decomposition.

Figure 1:
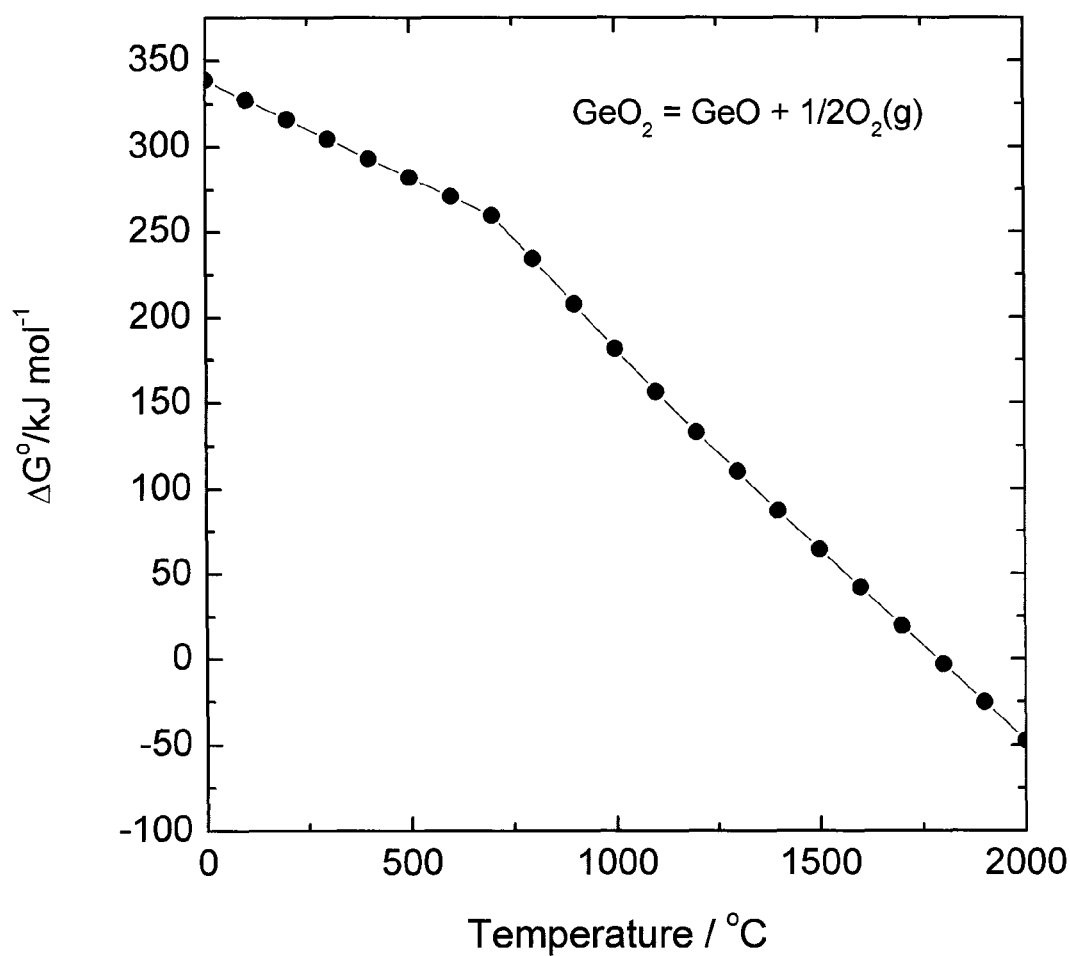
FIG. 1 is a graph illustrating the reaction Gibbs' free energy changes of $GeO_2$ decomposition according to the temperature changes.

FIG. 1 illustrates the reaction Gibbs' free energy changes of $GeO_2$ decomposition(reduction) according to the temperature changes.

As shown in FIG. 1, germanium oxide ($GeO_2$) used in this invention demonstrates the reaction Gibbs' free energy change close to 0 at 1500° C. under normal pressure, indicating that spontaneous thermal decomposition can be induced. Even if the reaction Gibb's free energy change is a positive value close to 0, decomposition can be continued as long as the reaction product is constantly eliminated by inert gas (argon, helium).

As a source of heat for the thermal decomposition, high temperature gas furnace, concentrated solar heat, nuclear reactor, and waste heat of blast furnace can be used.

Figure 2:
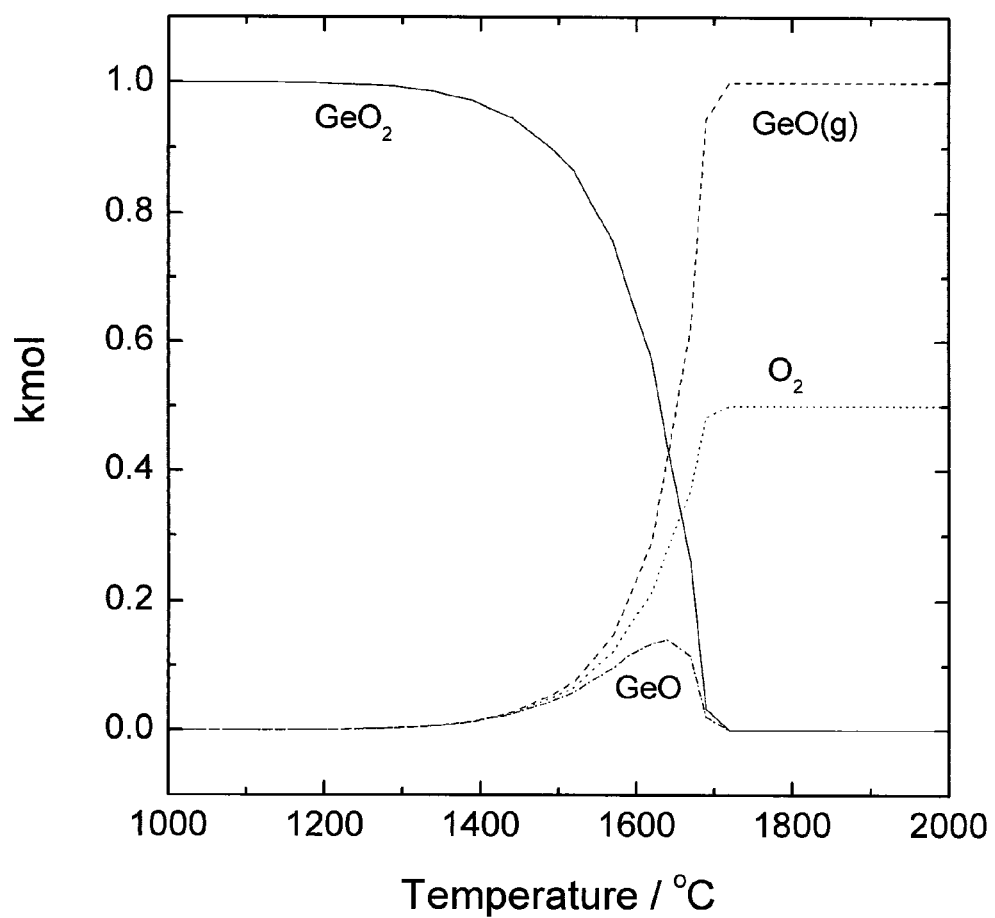
FIG. 2 is a graph illustrating the changes of equilibrium composition of 1 kmol of $GeO_2$ in the presence of 1 kmol of inert gas under the pressure of 1 atm according to the temperature changes.

FIG. 2 is a graph illustrating the changes of equilibrium composition of 1 kmol of $GeO_2$ in the presence of 1 kmol of inert gas under the pressure of 1 atm according to the temperature changes. Spontaneous decomposition of germanium oxide ($GeO_2$) is induced fast at 15000 and when the temperature reaches 1700° C., all germanium oxides ($GeO_2$) are decomposed into GeO. GeO is stable even at 1700° C. or higher.

Figure 3:
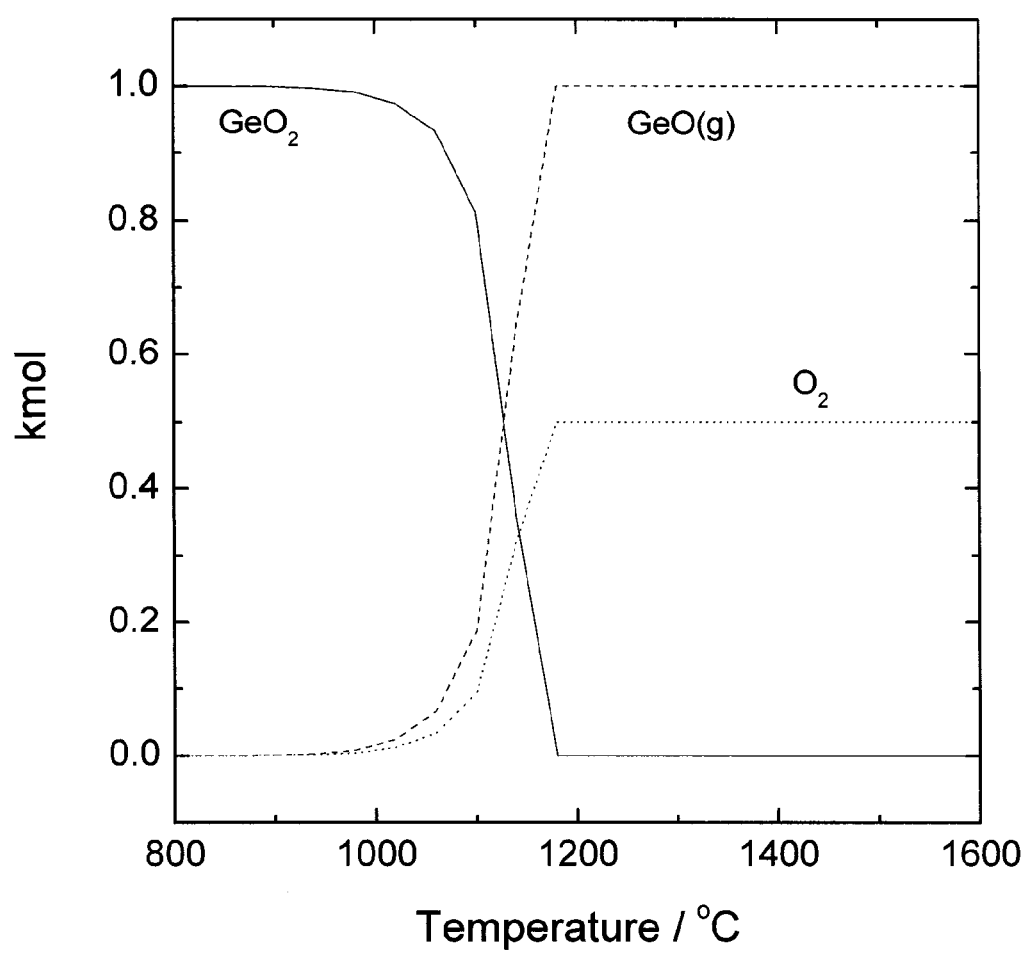
FIG. 3 is a graph illustrating the changes of equilibrium composition of 1 kmol of $GeO_2$ in the presence of 1 kmol of inert gas under the pressure of 0.001 atm according to the temperature changes.

FIG. 1 and FIG. 2 illustrate the changes of equilibrium composition of germanium oxide over the temperatures in the presence of inert gas under the pressure of 1 atm. FIG. 3 illustrates the changes of equilibrium composition of 1 kmol of $GeO_2$ over the temperatures in the presence of 1 kmol of inert gas under the pressure of 0.001 atm.

As shown in FIG. 3, in the presence of inert gas under the pressure of 0.001 atm, germanium oxide begins to be decomposed spontaneously at 1000° C. and when the temperature reaches 1200° C., all germanium oxides ($GeO_2$) are decomposed into GeO.

As shown in FIG. 1-FIG. 3, the thermochemical reduction (decomposition) of $GeO_2$ presented in reaction formula 1 is preferably performed in the presence of inert gas, at 1000° C.-17000, under the pressure of 1 atm-0.001 atm.

Considering the low temperature thermochemical process and thermal efficiency, it is more preferred to perform the thermochemical reduction of $GeO_2$ at 1000° C.-1500° C. under the pressure of 0.1 atm-0.001 atm.

The gas phase GeO (g) obtained by thermochemical reduction (decomposition) according to reaction formula 1 is preferably recovered by fast quenching and the recovered GeO (s) is reacted with water to produce hydrogen as shown in reaction formula 2.

In the step of fast quenching, the mixture of Ge and $GeO_2$ generated by spontaneous decomposition(disproportion) of GeO can also be recovered along with GeO. At this time, the recovered mixture (GeO, Ge, $GeO_2$) is reacted with water to produce hydrogen according to reaction formula 2 and reaction formula 4.

When all the GeO obtained in the step of reaction formula 1 are decomposed and the mixture of Ge and $GeO_2$ is recovered by fast quenching, the recovered mixture (Ge, $GeO_2$) is reacted with water to produce hydrogen according to reaction formula 4.

Figure 4:
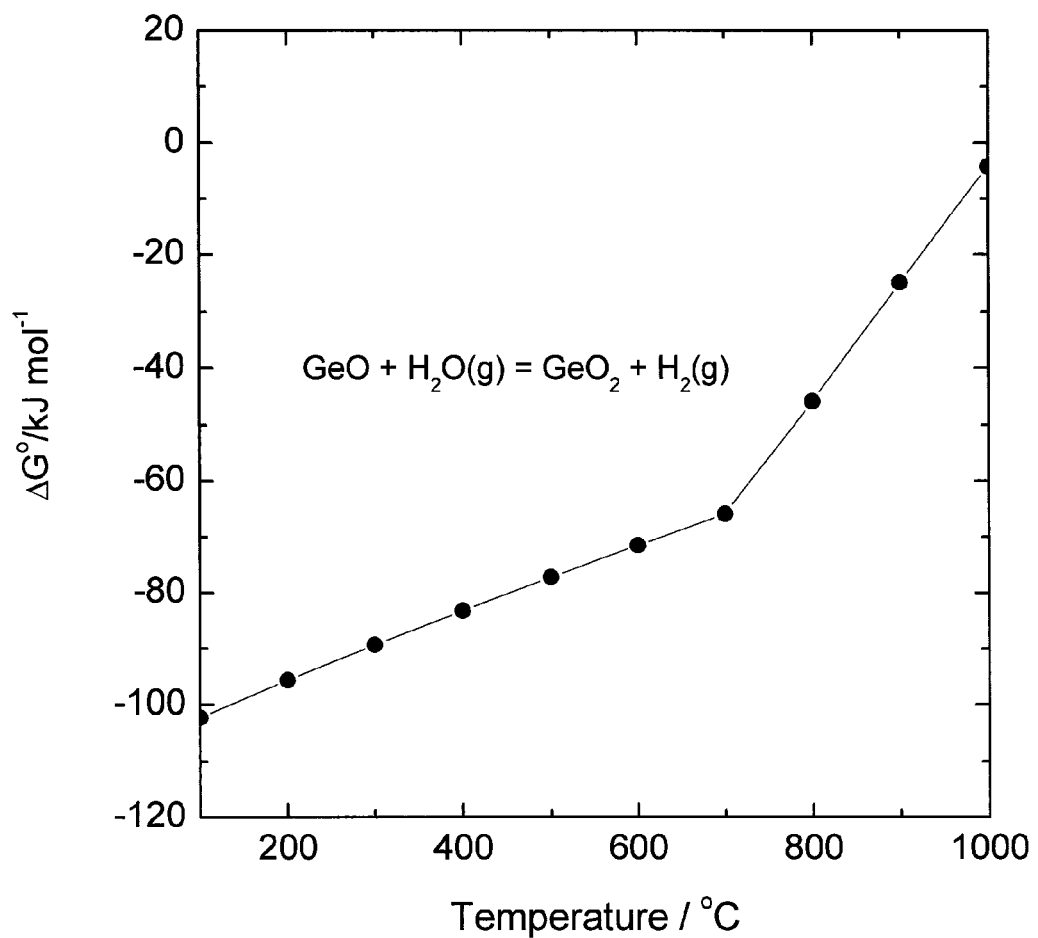
FIG. 4 is a graph illustrating the reaction Gibbs' free energy changes over temperatures when the reduced GeO and water are reacted.

FIG. 4 illustrates the reaction Gibb's free energy values over the temperatures when the reduced GeO and water are reacted. When the reduced GeO is reacted with water, reaction Gibb's free energy is negative value at the temperature of at lest 200° C., suggesting that the reaction is spontaneous.

Reaction of the reduced GeO or Ge generated from GeO and water (vapor) presented in reaction formula 2 or reaction formula 4 is preferably performed at 200° C.-800° C. where spontaneous decomposition is induced. When the reaction is induced at lower than 200° C., reaction speed is so slow that hydrogen production rate is decreased. In the meantime, when the reaction is induced at higher than 800° C., vaporization of GeO is so strong that construction of a production reactor is difficult.

Hydrogen can be produced from water by the said multistep thermochemical cycles. And, satisfactory conversion rate of chemical reaction and production yield of hydrogen can be accomplished by the thermochemical cycles composed of spontaneous reaction at the said conditions (reaction temperature and pressure).

EXAMPLE 1

Figure 5:
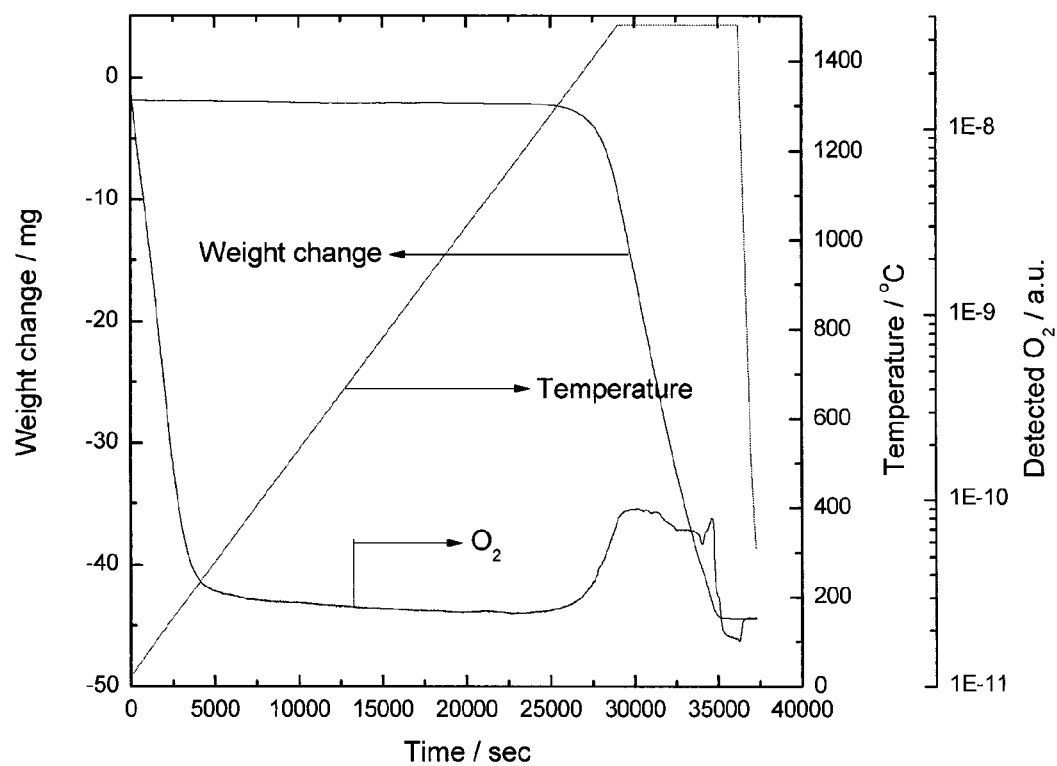
FIG. 5 is a graph illustrating the weight changes and oxygen generation due to $GeO_2$ decomposition over temperatures measured by thermogravimetry analyzer-mass spectrometer.

43 mg of $GeO_2$ powder (99.98%, Aldrich) was put in a 100 ul platinum crucible, which was installed in thermogravimetry analyzer (SETARAM, SETSYS Evolution, TGA DSC) connected with mass-spectroscopy. Ar gas was provided to the thermogravimetry analyzer (TGA) at 200 cc/min. The temperature was raised from room temperature to 1480° C. at the heating rate of 3° C./min. The temperature was maintained at 1480° C. for 2 hours, during which weight changes and oxygen generation by $GeO_2$ decomposition were observed. As shown in FIG. 5, $GeO_2$ began to be decomposed at around 1400° C. and when the temperature reached 1480° C., decomposition was completed and oxygen generation was confirmed.

EXAMPLE 2

Figure 6:
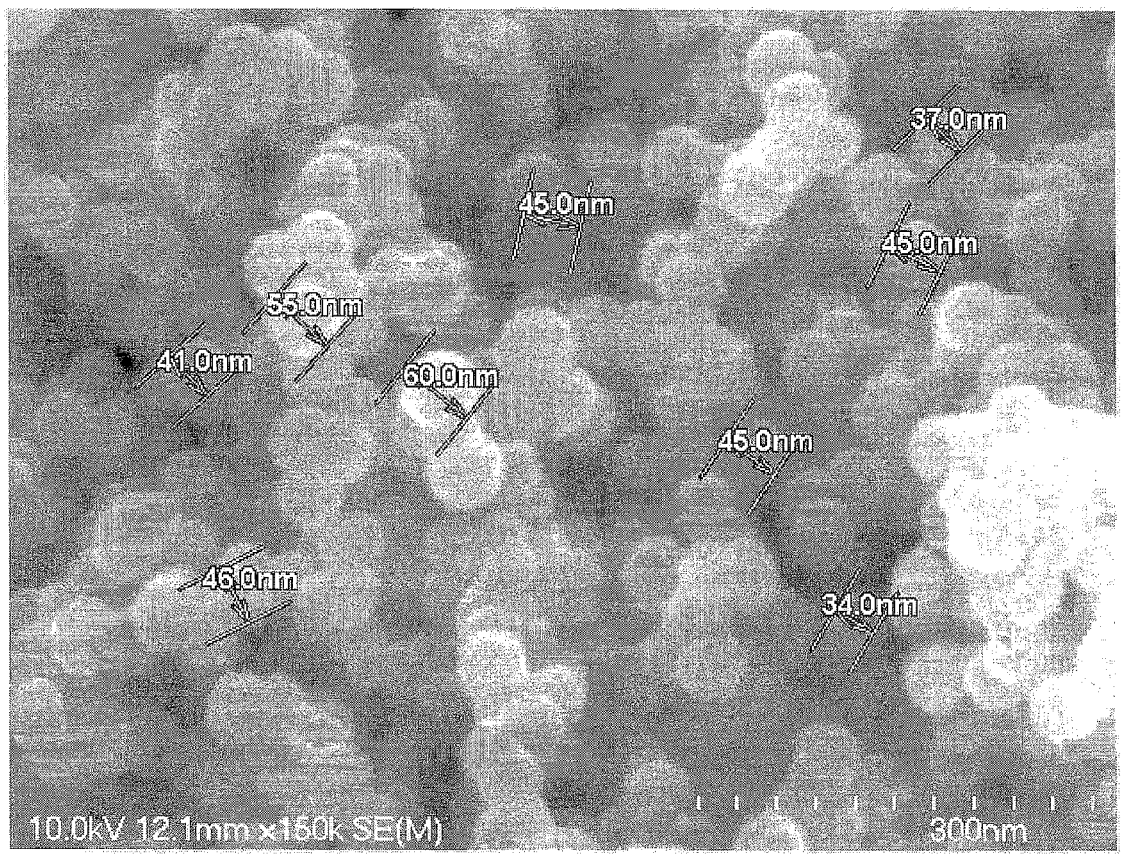
FIG. 6 is a photograph illustrating that the condensed and filtered particles from $GeO_2$ decomposition at 1460° C., examined under electron microscope.
Figure 7:
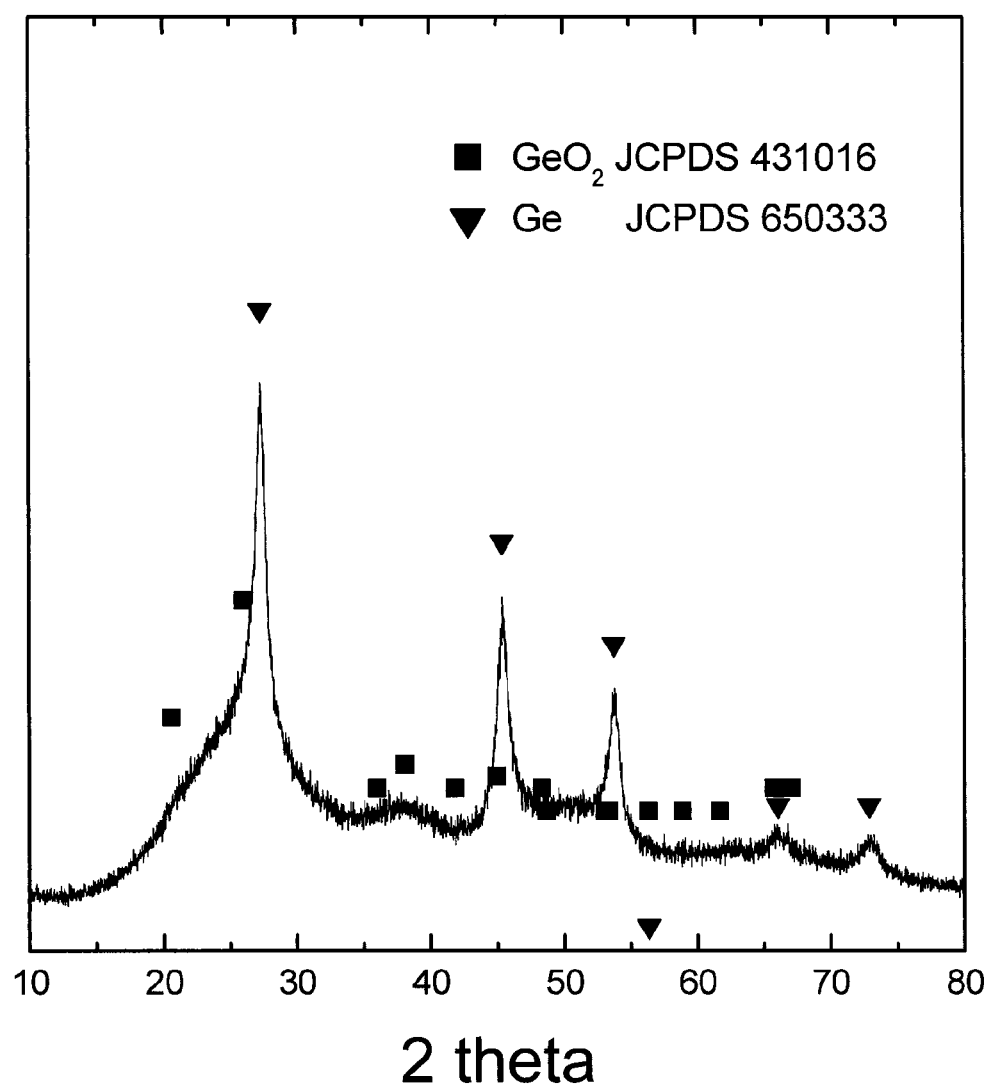
FIG. 7 is a graph illustrating that X-ray diffraction peaks of the condensed and filtered particles from $GeO_2$ decomposition at 1460° C.

0.145 g of $GeO_2$ powder (99.98%, Aldrich) was put in a 10 mm×10 mm×5 mm platinum crucible, which was fixed in a reactor composed of quartz tube of 20 mm in outer diameter. To cool down the product generated from the reactor, cooling coil through which cooling water was flowing was quipped to the outlet of the reactor. To collect the decomposed product, sintered metal filter having the pore size of 15 um was installed in the inlet of the reactor. Ar gas was provided to the reactor with a flow rate of 100 cc/min. Temperature of the reactor was regulated by Mo—Si heater using B-type thermocouple and temperature controller. The temperature was raised from room temperature to 1460° C. for 50 minutes and then maintained for 2 hours, during which $GeO_2$ was decomposed. Upon completion of the reaction, the temperature of the reactor was cooled down to room temperature and the product collected on the filter was analyzed by electron microscope and X-ray diffraction. FIG. 6 is a SEM photograph showing the collected product. As shown in FIG. 6, the round shaped product (30-60 nm in diameter) was obtained. As shown in FIG. 7, the obtained product was confirmed by X-ray diffraction as the mixture of Ge and $GeO_2$.

EXAMPLE 3

0.11 g of the collected product on the filter in Example 2 was loaded in a fixed-bed reactor, and then temperature was raised to room temperature to 750° C. at the speed of 20° C./min.

Figure 8:
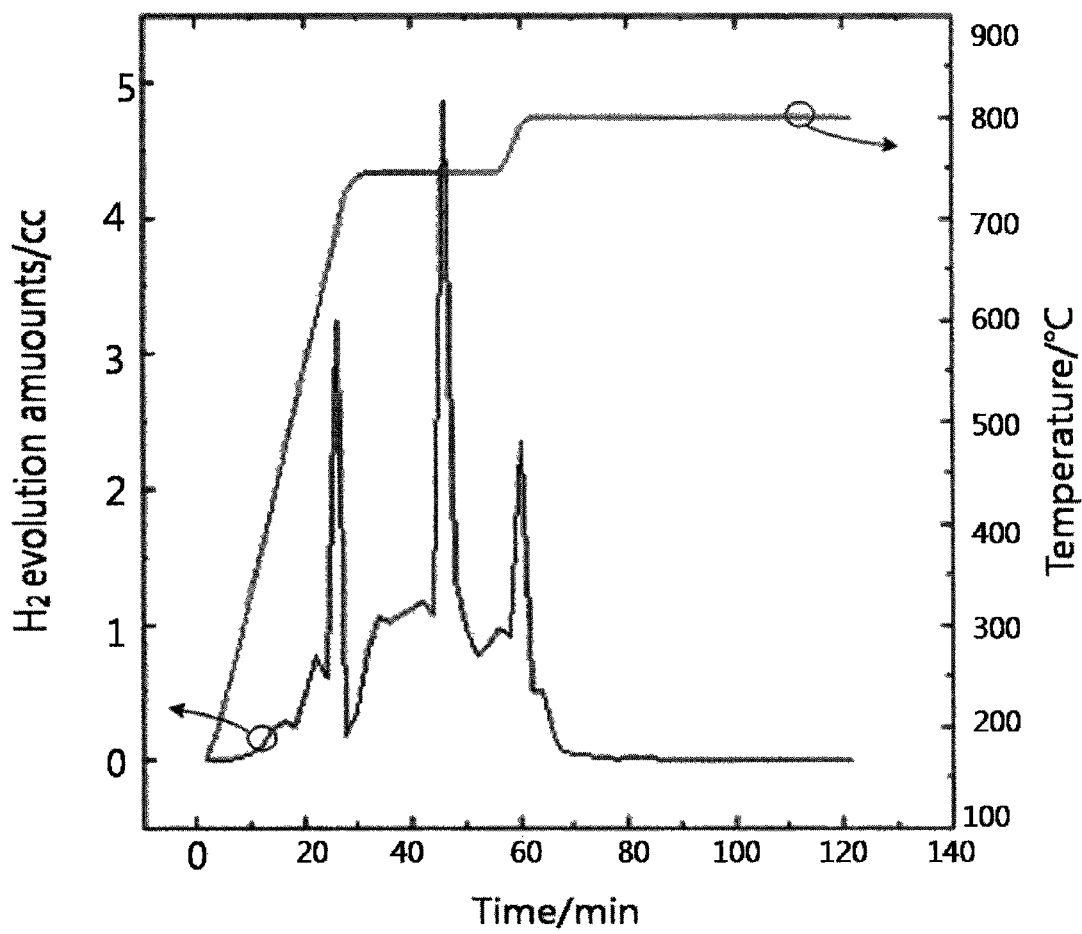
FIG. 8 is a graph illustrating the hydrogen production (black line) over the temperatures (red line) according to the reaction of the product generated by a series of decomposition of $GeO_2$ at 1460° C.; cooling; and filtering thereof and water in a fixed-bed reactor.

The temperature was maintained at 750° C. for 30 minutes, and then raised again at the speed of 20° C./min to 800° C. The temperature was maintained at 800° C. for 1 hour. In the inside of the reactor, Ar gas was supplied at the flow speed of 18 cc/min until the temperature was raised to 150° C. from room temperature. When the temperature of the reactor reached 150° C., Ar gas was saturated with 70° C. water vapor, which was provided into the reactor at the speed of 18 cc/min. The reaction product was cooled down to eliminate moisture, followed by sampling at 2 minutes interval. Hydrogen concentration was measured by gas chromatography (Agilent 7890, TCD). The amount of generated hydrogen was calculated by hydrogen concentration, gas flow rate and sampling time. The red line in FIG. 8 indicates the changes of temperature over the time and the black line indicates hydrogen amount. As shown in FIG. 8, hydrogen began to be generated from the temperature of 300° C.

Figure 9:
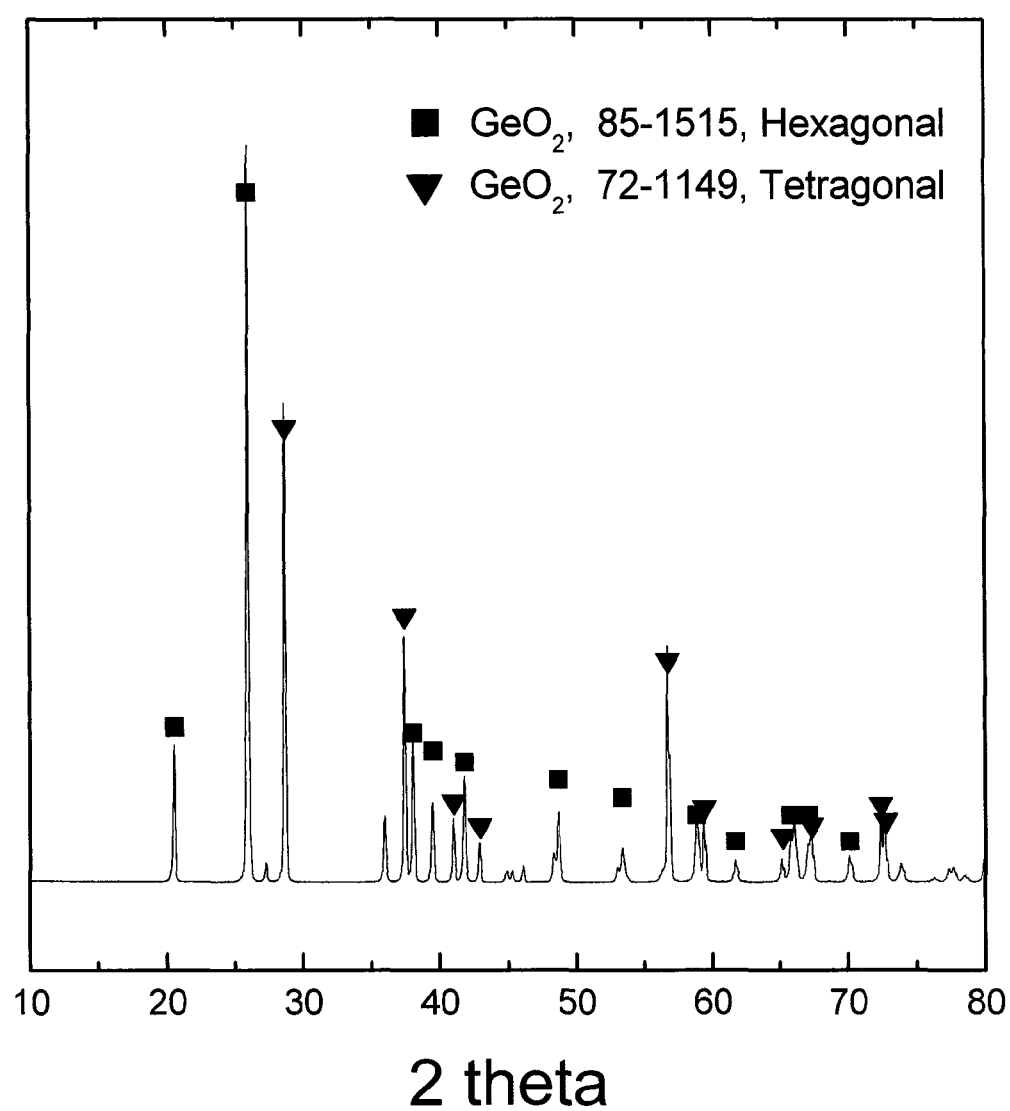
FIG. 9 is a graph illustrating the result of X-ray diffraction performed after the reaction of water and the product of $GeO_2$ obtained by the processes of decomposition at 1460° C., cooling and filtering thereof in a fixed-bed reactor.

And, when the temperature reached 600° C., hydrogen was generated massively. The total amount of hydrogen generated was 28 cc. X-ray diffraction was performed with the sample after water decomposition. As a result, as shown in FIG. 9, $GeO_2$ comprising the two structures of tetragonal and hexagonal was obtained.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A hydrogen production method from water by thermochemical cycles, comprising:
   a) thermochemically reducing $GeO_2$ to generate gas phase GeO(g) and oxygen according to Reaction Formula 1;
   b) cooling the gas phase GeO(g) to recover solid phase GeO(s), Ge(s), and $GeO_2$(s), or a mixture thereof; and
   c) allowing recovery materials recovered in the step b) to react with water to generate $GeO_2$ and hydrogen according to Reaction Formula 2, Reaction Formula 4, or Reaction Formula 2 and Reaction Formula 4, $$GeO_2 \rightarrow GeO + \tfrac{1}{2}O_2 \quad \text{(Reaction Formula 1)}$$

$$GeO + H_2O(g) \rightarrow GeO_2 + H_2 \quad \text{(Reaction Formula 2)}$$

$$\tfrac{1}{2}Ge + \tfrac{1}{2}GeO_2 + H_2O(g) \rightarrow GeO_2 + H_2 \quad \text{(Reaction Formula 4)}$$

wherein $GeO_2$ generated in the step c) is again input to the step a), and the steps a) to c) are repeatedly performed.

2. The hydrogen production method from water by thermochemical cycles according to claim 1, wherein the step a) is performed in the presence of inert gas, at 1000° C. -1700° C., under the pressure of 1 atm -0.001 atm.

3. The hydrogen production method from water by thermochemical cycles according to claim 1, wherein the step c) is performed at 200° C. -800° C.

4. The hydrogen production method from water by thermochemical cycles according to claim 1, wherein Ge(s) and $GeO_2$(s) are generated according to reaction formula 3, which is a spontaneous decomposition reaction of GeO generated in the step a) during cooling:

$$GeO \rightarrow \tfrac{1}{2}Ge + \tfrac{1}{2}GeO_2 \quad \text{(Reaction Formula 3)}.$$

* * * * *